United States Patent
Lee et al.

(10) Patent No.: US 9,786,916 B2
(45) Date of Patent: Oct. 10, 2017

(54) ELECTRODE AND SECONDARY BATTERY INCLUDING THE SAME

(71) Applicant: LG Chem, Ltd., Seoul (KR)

(72) Inventors: Min Hee Lee, Gyeonggi-do (KR); Tae Jin Park, Daejeon (KR); Daehong Kim, Daejeon (KR)

(73) Assignee: LG Chem, Ltd. (KR)

(*) Notice: Subject to any disclaimer, the term of this patent is extended or adjusted under 35 U.S.C. 154(b) by 426 days.

(21) Appl. No.: 14/489,894

(22) Filed: Sep. 18, 2014

(65) Prior Publication Data

US 2015/0004487 A1    Jan. 1, 2015

Related U.S. Application Data

(63) Continuation of application No. PCT/KR2013/003282, filed on Apr. 18, 2013.

(30) Foreign Application Priority Data

Apr. 18, 2012    (KR) .................. 10-2012-0040519

(51) Int. Cl.
| | |
|---|---|
| H01M 4/58 | (2010.01) |
| H01M 4/66 | (2006.01) |
| H01M 4/131 | (2010.01) |
| H01M 4/485 | (2010.01) |
| H01M 4/505 | (2010.01) |
| H01M 10/0525 | (2010.01) |
| H01M 4/62 | (2006.01) |
| H01M 10/052 | (2010.01) |

(52) U.S. Cl.
CPC ......... *H01M 4/5825* (2013.01); *H01M 4/131* (2013.01); *H01M 4/485* (2013.01); *H01M 4/505* (2013.01); *H01M 4/624* (2013.01); *H01M 4/625* (2013.01); *H01M 4/663* (2013.01); *H01M 4/667* (2013.01); *H01M 10/052* (2013.01); *H01M 10/0525* (2013.01); *H01M 2220/20* (2013.01); *Y02E 60/122* (2013.01); *Y02T 10/7011* (2013.01)

(58) Field of Classification Search
CPC .... H01M 4/5825; H01M 4/667; H01M 4/131; H01M 4/485; H01M 4/505; H01M 4/624; H01M 4/625; H01M 4/663; H01M 10/0525; H01M 10/052; H01M 2220/20; Y02E 60/122

See application file for complete search history.

(56) References Cited

U.S. PATENT DOCUMENTS

| | | |
|---|---|---|
| 5,262,254 A | 11/1993 | Koksbang et al. |
| 5,588,971 A | 12/1996 | Fauteux et al. |
| 2003/0194605 A1 | 10/2003 | Fauteux et al. |
| 2009/0181309 A1 | 7/2009 | Kwon et al. |
| 2009/0263707 A1 | 10/2009 | Buckley et al. |
| 2010/0151318 A1 | 6/2010 | Lopatin et al. |
| 2011/0311869 A1 | 12/2011 | Oh et al. |
| 2012/0107658 A1 | 5/2012 | Kwon et al. |
| 2012/0135306 A1 | 5/2012 | Temmyo |
| 2012/0237824 A1 | 9/2012 | Koh et al. |

FOREIGN PATENT DOCUMENTS

| | | |
|---|---|---|
| CN | 101174685 A | 5/2008 |
| CN | 101488567 A | 7/2009 |
| CN | 102104140 A | 6/2011 |
| EP | 1487039 A1 | 12/2004 |
| EP | 2284235 A1 | 2/2011 |
| JP | 2000-195523 A | 7/2000 |
| JP | 2001-243952 A | 9/2001 |
| JP | 2007-329004 A | 12/2007 |
| JP | 2009-505929 A | 2/2009 |
| JP | 2011081931 A | 4/2011 |
| JP | 2012-512505 A | 5/2012 |
| JP | 2013-538427 A | 10/2013 |
| KR | 2008-0015162 A | 2/2008 |
| KR | 2008-0036261 A | 4/2008 |
| KR | 2011-0097719 A | 8/2011 |
| KR | 10-1120437 B1 | 3/2012 |
| WO | 2011/037124 A1 | 3/2011 |
| WO | 2011-121950 A1 | 10/2011 |

OTHER PUBLICATIONS

International Search Report from PCT/KR2013/003282 dated Jul. 18, 2013.

*Primary Examiner* — Laura Weiner
(74) *Attorney, Agent, or Firm* — Lerner, David, Littenberg, Krumholz & Mentlik, LLP

(57) ABSTRACT

Disclosed is an electrode for secondary batteries including an electrode mixture including an electrode active material, binder and conductive material coated on a current collector wherein a conductive material is coated to a thickness of 1 to 80 μm on the current collector and the electrode mixture is coated on a coating layer of the conductive material so as to improve electrical conductivity.

11 Claims, 2 Drawing Sheets

[FIG. 1]
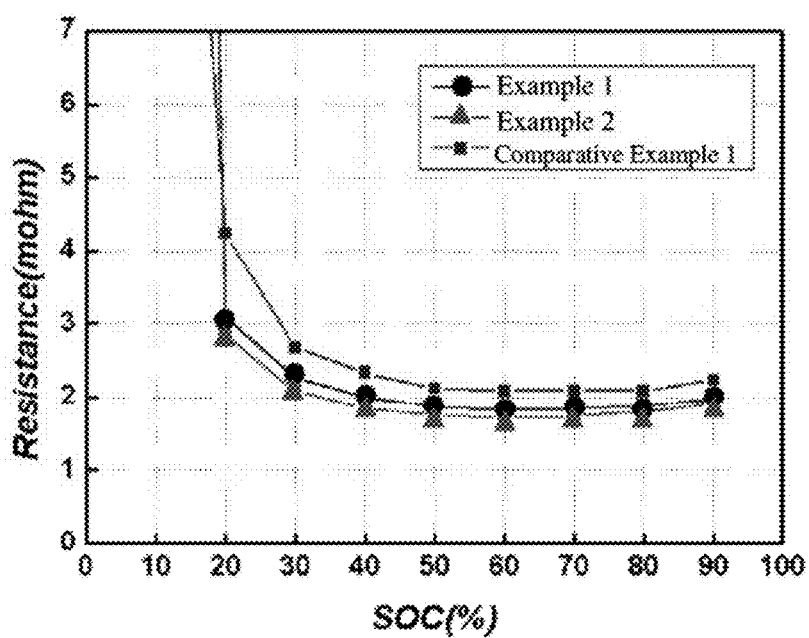

[FIG. 2]
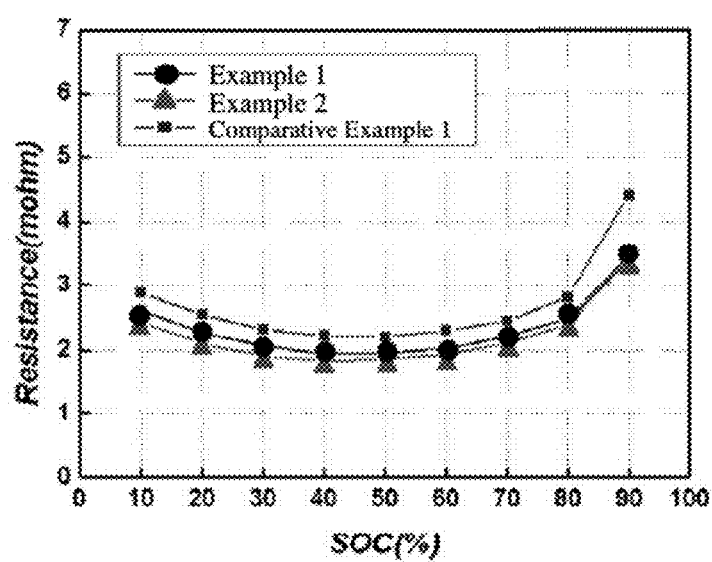

ELECTRODE AND SECONDARY BATTERY INCLUDING THE SAME

CROSS-REFERENCE TO RELATED APPLICATIONS

The present application is a continuation of International Application No. PCT/KR2013/003282, filed on Apr. 18, 2013, which claims priority from Korean Patent Application No. 10-2012-0040519, filed on Apr. 18, 2012, in the Korean Intellectual Property Office, the disclosures thereof are incorporated herein by reference.

TECHNICAL FIELD

The present invention relates to an electrode for secondary batteries including an electrode mixture including an electrode active material, binder and conductive material coated on a current collector and a secondary battery including the same wherein a conductive material is coated to a thickness of 1 to 80 μm on the current collector and the electrode mixture is coated on a coating layer of the conductive material so as to improve electrical conductivity.

BACKGROUND ART

As mobile device technology continues to develop and demand therefor continues to increase, demand for secondary batteries as energy sources is rapidly increasing. Among secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

Conventional lithium ion secondary batteries generally use a lithium cobalt composite oxide as a cathode and a graphite-based material as an anode. However, study is recently being conducted with regard to using a spinel-structure lithium nickel-based metal oxide as a cathode and a lithium titanium oxide as an anode active material instead of the conventional materials.

In such lithium secondary batteries, charging and discharging processes are performed while lithium ions of a cathode are repeatedly intercalated into and deintercalated from an anode. Although there are differences in theoretical capacities of batteries according to kinds of electrode active materials, in most cases, charge and discharge capacities are deteriorated as cycles proceed.

Such phenomenon is mainly attributed to non-functioning of active materials due to separation of electrode active material components or separation between an electrode active material and a current collector by change in volume of an electrode occurring as charging and discharging of a battery proceed. In addition, in the intercalation and deintercalation processes, lithium ions intercalated into an anode are unable to be properly deintercalated therefrom and thus an anode active site is reduced and, accordingly, charge and discharge capacities and lifespan characteristics of a battery are deteriorated as cycles proceed.

Therefore, there is an urgent need to develop technology which may impart high adhesion between an active material and a current collector to improve battery capacity, and, at the same time, may exhibit superior electrical conductivity to improve battery performance.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a conductive material having a predetermined thickness is coated on a current collector and then an electrode mixture is coated on a coating layer of the conductive material, desired effects may be achieved, thus completing the present invention.

Technical Solution

In accordance with one aspect of the present invention, provided is an electrode for secondary batteries including an electrode mixture including an electrode active material, binder and conductive material coated on a current collector wherein a conductive material is coated to a thickness of 1 to 80 μm on the current collector and the electrode mixture is coated on a coating layer of the conductive material so as to improve electrical conductivity The electrode for secondary batteries according to the present invention is coated with an electrode mixture after first coating a conductive material on a current collector and, as such, the conductive material helps to smoothly move electrons between a current collector and electrode active material. As a result, electrical conductivity is improved and thereby internal resistance of batteries may be reduced as well as rate characteristics may be improved.

Such a conductive material is not limited so long as it is known in the art as a material having electrical conductivity improvement effect and may be one, two or more selected from the group consisting of graphite, carbon nanotube, graphene, and a conductive polymer.

Here, the conductive polymer may be one, two or more selected from the group consisting of polyaniline, polypyrrole, polyacetylene, polythiophene, poly(p-phenylene vinylene), poly (p-phenylene), poly(thienylene vinylene), poly(ethylenedioxythiophene), polyisothianaphthence, poly(p-phenylenesulfide), particularly may be one, two or more selected from the group consisting of poly aniline, poly pyrrole, poly acetylene and poly thiophene.

The thickness of the coating layer may be 1 to 80 μm as described above, particularly 20 to 70 μm, more particularly 30 to 60 μm. The coating layer may be coated on 40 to 90%, particularly 50 to 80% of the entire area of a current collector. When a coating layer is too thin or a coated area is too small, enhanced adhesion according to conductive polymer layer formation is not anticipated. On the other hand, when a coating layer is too thick or a coated area is too large, internal resistance increases and thereby battery performance may be deteriorated.

In one embodiment, the coating layer may be formed by drying after coating a mixture including a conductive polymer on a current collector. Here, a method of coating a coating layer is not specifically limited. As a representative example, the coating method may be a spray coating method. In addition, the mixture may include a surfactant and the like besides a conductive polymer such that a conductive polymer adheres to a surface of a current collector. Here, the conductive polymer and surfactant may be manufactured by dissolving, for example, in an NMP solution and the like.

The electrode may be a cathode including a cathode active material and/or an anode including an anode active material.

The cathode for a secondary battery is manufactured by drying and pressing after coating a mixture including a cathode active material, conductive material and binder on a cathode current collector. In this case, as desired, a filler may be further added to the mixture.

The cathode current collector is generally manufactured to a thickness of 3 to 500 μm. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The cathode active material may be layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-x}M_xO_2$ where M=Co, Mn, Al, Cu, Fe, Mg, B, or Ga, and $0.01 \leq x \leq 0.3$; lithium manganese composite oxides of Formula $LiMn_{2-x}M_xO_2$ where M=Co, Ni, Fe, Cr, Zn, or Ta, and $0.01 \leq x \leq 0.1$), or Formula $Li_2Mn_3MO_8$ where M=Fe, Co, Ni, Cu, or Zn; spinel-structure lithium manganese composite oxides of $LiNi_xMn_{2-x}O_4$; $LiMn_2O_4$ in which some of the Li atoms are substituted with alkaline earth metal ions; disulfide compounds; $Fe_2(MoO_4)_3$; and the like. In particular, the cathode active material may include a spinel-structure lithium metal oxide represented by Formula 1 below:

$$Li_xM_yMn_{2-y}O_{4-z}A_z \quad (1)$$

wherein $0.9 \leq x \leq 1.2$ and $0 < y < 2$, $0 \leq z < 0.2$; M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or divalent anion.

More particularly, the lithium metal oxide may be represented by Formula 2 below:

$$Li_xNi_yMn_{2-y}O_4 \quad (2)$$

wherein $0.9 \leq x \leq 1.2$ and $0.4 \leq y \leq 0.5$.

The lithium metal oxide may be, more particularly, $LiNi_{0.5}Mn_{1.5}O_4$ or $LiNi_4Mn_{1.6}O_4$.

The conductive material is generally added in 1 to 20 wt % based on the total weight of a mixture including a cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the electrode active material and the conductive material and in binding of the electrode active material to the electrode current collector. The binder is typically added in an amount of 1 to 50 wt % based on the total weight of the mixture including the cathode active material. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

On the other hand, an anode is manufactured by coating, drying and pressing an anode active material on an anode a current collector and as needed, the above conductive material, binder and filler may further be included selectively.

An anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The anode active material may be, for example, may be carbon such as hard carbon and graphite-based carbon; metal composite oxides such as $Li_xFe_2O$ where $0 \leq x \leq 1$, $Li_xWO_2$ where $0 \leq x \leq 1$, and $Sn_xMe_{1-x}Me'_yO_z$ where Me: Mn, Fe, Pb or Ge; Me': Al, B, P, Si, Group I, Group II and Group III elements, or halogens; ($0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials; and the like. In particular, the anode active material may be a lithium metal oxide represented by Formula 3 below:

$$Li_aM'_bO_{4-c}A_c \quad (3)$$

wherein M' is at least one element selected from the group consisting of Ti, Sn, Cu, Pb, Sb, Zn, Fe, in, Al and Zr; $0.1 \leq a \leq 4$ and $0.2 \leq b \leq 4$ in which a and b are determined according to oxidation number of M'; $0 \leq c < 0.2$ in which c is determined according to oxidation number of A; and A is at least one monovalent or divalent anion.

The oxide of Formula 3 may be represented by Formula 4 below:

$$LiA Ti_bO_4 \quad (4)$$

More particularly, the lithium metal oxide may be $Li_{1.33}Ti_{1.67}O_4$ or $LiTi_2O_4$.

In an embodiment, when a lithium titanium oxide (LTO) is used as the anode active material, LTO has low electrical conductivity and thus may have the electrode structure described above. In addition, in this case, due to high potential of LTO, a spinel lithium manganese composition oxide having relatively high potential, such as $LiNi_xMn_{2-x}O_4$ where $0.01 \le x \le 0.6$, may be used as the cathode active material.

In addition, the present invention provides a secondary battery in which an electrode assembly including the cathode, the anode, and a separator disposed therebetween is impregnated with a lithium salt-containing electrolyte.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as a separator.

The lithium salt-containing electrolyte is composed of an electrolyte and a lithium salt. As the electrolyte, a non-aqueous organic solvent, an organic solid electrolyte, an inorganic solid electrolyte, or the like may be used.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, and $Li_3PO_4-Li_2S-SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In one embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent of a cyclic carbonate such as EC or PC, which is a high dielectric solvent, and a linear carbonate such as DEC, DMC, or EMC, which is a low-viscosity solvent.

The present invention also provides a battery module including the secondary battery as a unit battery and a battery pack including the battery module.

The battery pack may be used as a power source of medium and large devices that require high-temperature stability, long cycle characteristics, high rate characteristics, and the like.

Examples of the medium and large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph measuring a resistance change ratio according to state of charge (SOC) when a secondary battery according to Experimental Example 1 is discharged; and FIG. 2 is a graph measuring a resistance change ratio according to state of charge (SOC) when a secondary battery according to Experimental Example 2 is charged.

MODE FOR INVENTION

Now, the present invention will be described in more detail with reference to the following examples. These examples are provided only for illustration of the present invention and should not be construed as limiting the scope and spirit of the present invention.

Example 1

Carbon was coated on a total area of an aluminum current collector, resulting in a of 30 μm thickness carbon layer. Thereafter, 95 wt % of lithium titanium oxide as an anode active material, 2.5 wt % of Super-P as a conductive material and 2.5 wt % of PVdF as a binder were added to NMP to manufacture an anode mixture. The anode mixture was coated on the current collector, in which a carbon layer was formed, resulting in an anode for secondary batteries.

Example 2

An anode for secondary batteries was manufactured in the same manner as in Example 1, except that carbon was coated on an aluminum current collector, resulting in a 50 μm thickness carbon layer.

Comparative Example 1

An anode for secondary batteries was manufactured in the same manner as in Example 1, except that a carbon layer was not formed on an aluminum current collector.

Experimental Example 1

The anodes manufactured according to Examples 1 and 2 and, Comparative Example 1, cathodes coated with a cathode mixture manufactured by adding 90 wt % of $LiNi_{0.5}Mn_{1.5}O_4$ as a cathode active material, 5 wt % of Super-P as a conductive material and PVdF as 5 wt % of a binder to NMP, and porous separators made of a polypropylene were used to manufacture electrode assemblies. Thereafter, after inserting the electrode assemblies into pouches and connecting lead wires, mixture solutions of ethylene carbonate (EC) and dimethyl carbonate (DMC) dissolved in 1 M $LiPF_6$ salt in a volume ratio of 1:1 were added to electrolytes and then sealed so as to assemble lithium secondary batteries. Resistance change ratios were measured according to state of charge (SOC) during discharge of the secondary batteries. Results are shown in FIG. 1 below.

As shown FIG. 1, the resistances of the batteries according to Examples 1 and 2 were reduced at SOC of 50%, when compared to that of the battery according to Comparative Example 1.

Experimental Example 2

The anodes manufactured according to Examples 1 and 2, and Comparative Example 1, cathodes coated with a cathode mixture manufactured by adding 90 wt % of $LiNi_{0.5}Mn_{1.5}O_4$ as a cathode active material, 5 wt % of Super-P as a conductive material and PVdF as 5 wt % of a binder to NMP, and porous separators made of a polypropylene were used to manufacture electrode assemblies. Thereafter, after inserting the electrode assemblies into pouches and connecting lead wires, solutions of ethylene carbonate (EC) and dimethyl carbonate (DMC) dissolved in 1 M $LiPF_6$ salt in a volume ratio of 1:1 were added to electrolytes and then sealed so as to assemble lithium secondary batteries. Resistance change ratios were measured according to state of charge (SOC) during charging of the secondary batteries. Results are shown in FIG. 2 below.

As shown FIG. 2, the resistances of the batteries according to Examples 1 and 2 were reduced at SOC of 50%, when compared to that of the battery according to Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an electrode for secondary batteries according to the present invention is coated with a conductive material in a predetermined thickness on a current collector, and an electrode mixture including an electrode active material, binder and conductive material are coated on the coating layer of the conductive material, whereby electrical conductivity is enhanced and the internal resistance of a battery is reduced, and, accordingly, superior rate characteristics are exhibited.

The invention claimed is:

1. An anode for secondary batteries comprising:
   a coating layer of a conductive material having a thickness of 30 to 80 μm on a current collector, and
   an anode mixture comprising an anode active material, a binder and the same conductive material of the coating layer,
   wherein the conductive material is at least one of carbon nanotube or graphene.

2. The anode according to claim 1, wherein the coating layer is coated on 40 to 90% of a total area of the current collector.

3. The anode according to claim 1, wherein the anode comprises a lithium metal oxide represented by Formula 3 below:

$$Li_aM'_bO_{4-c}A_c \quad (3)$$

wherein M' is at least one element selected from the group consisting of Ti, Sn, Cu, Pb, Sb, Zn, Fe, In, Al and Zr;
0.1≤a≤4 and 0.2≤b≤4 in which a and b are determined according to oxidation number of M';
0≤c≤0.2 in which c is determined according to oxidation number of A; and
A is at least one monovalent or divalent anion.

4. The anode according to claim 3, wherein the lithium metal oxide is represented by Formula 4 below:

$$Li_aTi_bO_4 \quad (4)$$

wherein 0.5≤a≤3 and 1≤b≤2.5.

5. The anode according to claim 4, wherein the lithium metal oxide is $Li_{1.33}Ti_{1.67}O_4$ or $LiTi_2O_4$.

6. A secondary battery comprising the anode according to claim 1.

7. The secondary battery according to claim 6, wherein the secondary battery is a lithium secondary battery.

8. A battery module comprising the secondary battery according to claim 7 as a unit battery.

9. A battery pack comprising the battery module according to claim 8.

10. A device comprising the battery pack according to claim 9.

11. The device according to claim 10, wherein the device is an electric vehicle, a hybrid electric vehicle, a plug-in hybrid electric vehicle, or a system for storing power.

* * * * *